Jan. 16, 1945.   C. M. OSTERHELD   2,367,369
ELECTRIC TANK HEATER
Filed Dec. 21, 1942   2 Sheets-Sheet 1
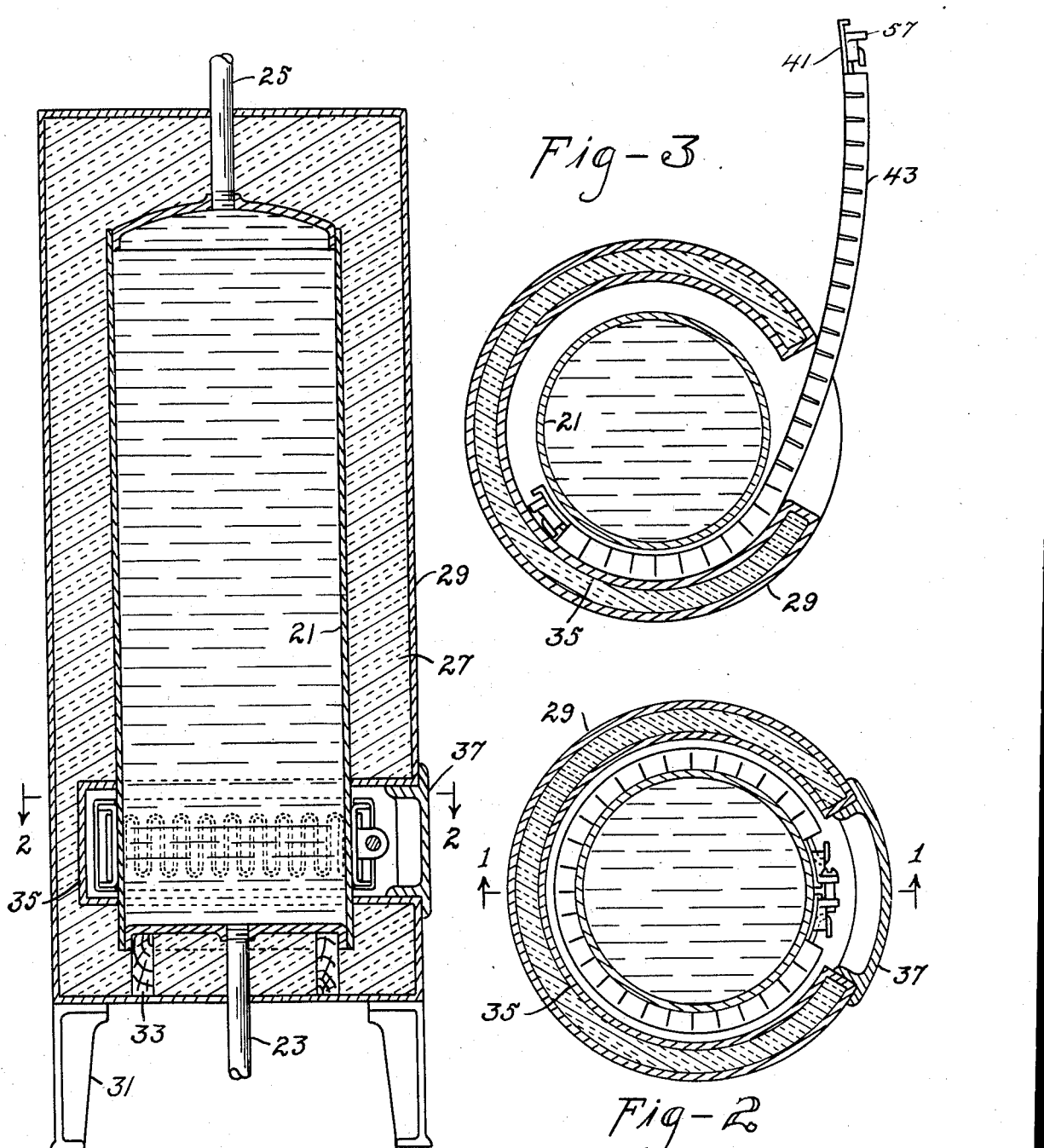
INVENTOR.
CLARK M. OSTERHELD
BY
ATTORNEY Jan. 16, 1945.  C. M. OSTERHELD  2,367,369
ELECTRIC TANK HEATER
Filed Dec. 21, 1942   2 Sheets-Sheet 2
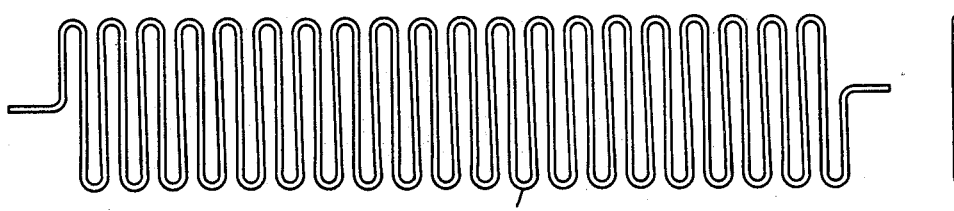
Fig-4
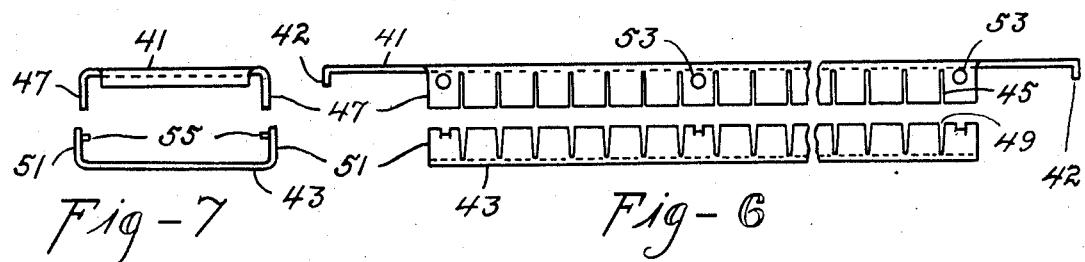
Fig-5
Fig-7  Fig-6
Fig-9
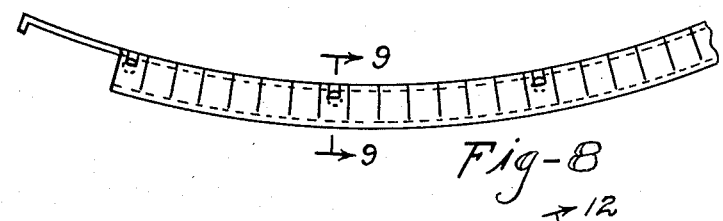
Fig-8
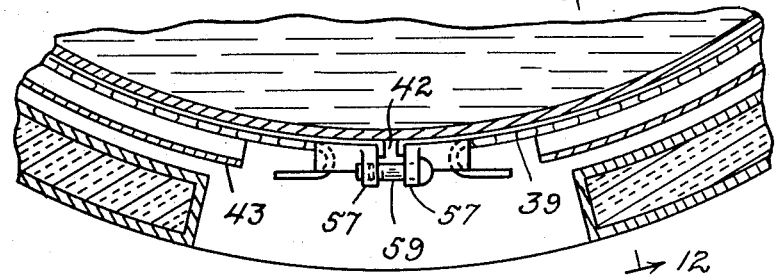
Fig-10
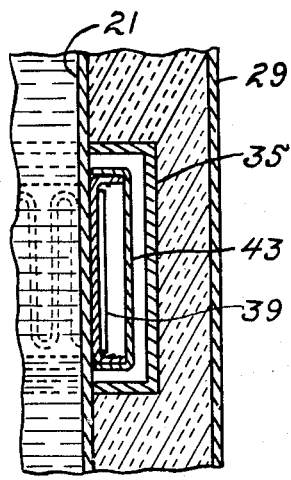
Fig-12
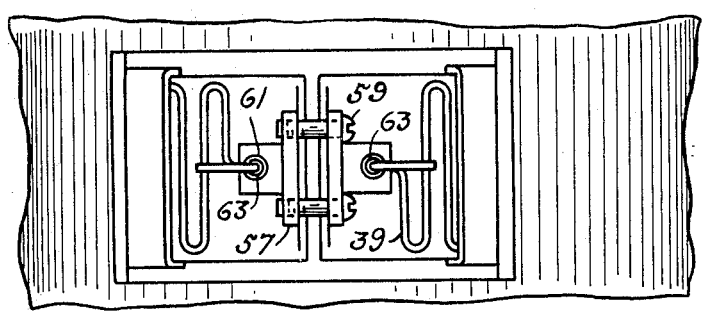
Fig-11
INVENTOR.
CLARK M. OSTERHELD
BY
ATTORNEY Patented Jan. 16, 1945

2,367,369

UNITED STATES PATENT OFFICE 2,367,369

ELECTRIC TANK HEATER

Clark M. Osterheld, Stoughton, Wis., assignor to McGraw Electric Company, Elgin, Ill., a corporation of Delaware Application December 21, 1942, Serial No. 469,665

8 Claims. (Cl. 219—38)

My invention relates to domestic hot water tanks and particularly to electric clamp-on heating units therefor.

An object of my invention is to provide a relatively simple, novel, electric heating element adapted to be held in heat-conducting relation with the outside surface of a domestic hot water tank.

Another object of my invention is to provide an electric heating unit for a hot water tank that shall embody a very thin layer of electric-insulating material between the resistance conductor and the tank.

Another object of my invention is to provide a relatively very simple electric heating unit that can be mounted in proper operative position on a tank and be easily and quickly removed therefrom in case of necessity.

Other objects of my invention will either be apparent from a description of one form of device embodying my invention and now preferred by me or will be pointed out in the course of a description thereof and set forth particularly in the appended claims.

In the drawings,

Figure 1 is a vertical sectional view of a hot water tank having mounted thereon an electric heater embodying my invention and taken on the line 1—1 of Fig. 2, Fig. 2 is a sectional plan view on the line 2—2 of Fig. 1, Fig. 3 is a sectional view similar to Fig. 2 but showing the method of assembling the heater in operative relation to the tank wall, Fig. 4 is a plan view of the resistor element particularly embodying my invention, Fig. 5 is an end view of the element shown in Fig. 4, Fig. 6 is an exploded view of two parts of the heater unit embodying my invention and adapted to house the resistor element of Figs. 4 and 5, Fig. 7 is an exploded end view of the parts shown in Fig. 6, Fig. 8 is a top plan view of the parts shown in Fig. 6 as assembled with each other, Fig. 9 is a view in lateral section thereof taken on the line 9—9 of Fig. 8, Fig. 10 is a fragmentary horizontal sectional view showing the method and means for holding the resistor in operative heat-conducting engagement with the tank wall, Fig. 11 is a front view of the parts shown in Fig. 10, and, Fig. 12 is a fragmentary sectional view taken on the line 12—12 of Fig. 10.

Referring first of all to Figs. 1, 2 and 3, I have there shown a standard domestic hot water tank 21 which is provided with a cold water inlet pipe 23 and a hot water outlet pipe 25, all in a manner now well known in the art.

The tank assembly includes heat insulating material 27 surrounding the tank over its entire surface, as well as an outer casing 29 and supporting legs 31. The bottom of the tank may be spaced by means of wood blocks 33 from the lower wall of the casing and while I have shown a particular embodiment of all of these elements, I do not desire to be limited thereto since these are shown only in order to illustrate a complete assembly with which the heating unit embodying my invention may be associated.

I provide an annular tunnel 35 preferably near the lower end of the tank and while I have shown only one such tunnel I do not desire to be limited thereto since I may use my heating unit not only at the lower end of the tank but also in a second tunnel positioned above the first tunnel. I provide an easily and quickly insertable and removable cover member 37 for the tunnel for a purpose which will hereinafter appear.

Referring now to Fig. 4 of the drawings, I have there illustrated a resistance conductor 39 which is made of metal and may consist of some metallic resistance material now well known in the art, such as Nichrome. However, I do not desire to be limited to this particular type of resistance conductor but may use aluminum or a suitable aluminum alloy.

The entire surface of the resistance conductor 39 is provided with an artificially produced electric-insulating coating which has the further characteristics of being heat-conducting, inorganic, integral with the resistance conductor and high temperature-resisting. Having reference particularly to aluminum it is, of course, known that ordinary aluminum will immediately have formed thereon, when subjected to the atmosphere, a very thin oxide coating but this coating is not that to which the above description refers. The coating referred to above may have a thickness on the order of .0004" or slightly greater and the above dimension is given by way of example only. Such coating may be formed by electrolytic action in which case it is usually called an "anodic" coating although the provision of such coating by electrolytic action is not necessary and mere immersion of the aluminum material in a proper solution, all as now well known in the art, may be used.

The resistance conductor 39 is shown in its finished state as far as shaping the same is concerned and as so shaped, it includes a plurality of substantially parallel laterally-extending portions connected at alternate ends by integral longitudinally-extending portions. During such forming by suitable mechanical means now well known in the art, the resistance conductor is caused to retain inherent springiness or resiliency for a purpose to be hereinafter set forth. I have found it possible to make and shape a resistance conductor 39 so that it will retain sufficient springiness or inherent resiliency for my particular purpose.

I have illustrated in Figs. 6 to 9 inclusive a housing or sheath within which the formed resistance conductor 39 may be mounted and secured in good heat-conducting relation with the outer surface of the tank 21. For this purpose I provide an inner housing or sheath member 41 having bent-out end portions 42 thereon and a cooperating outer housing or sheath member 43, each of these members consisting preferably of a relatively thin sheet of aluminum and formed to substantially channel-shape, as shown more particularly in Figs. 7 and 9 of the drawings.

Since it is desired to assemble these two half portions 41 and 43 in substantially the manner shown in Fig. 9 and since these members are to be mounted on and around the outside surface of the tank 21, I prefer to provide lateral slots 45 in each of the bent edge portions 47 of member 41 and substantially similar lateral slots 49 in the bent edge portions 51 of member 43. I further provide openings 53 in the two bent edge portions 47 spaced suitable distances from each other and provide small bent in or hook portions 55 on the edge portions 51 of member 43. When the two members 41 and 43 are moved into proper operative engagement with each other, into substantially the relative positions shown in Fig. 9, the hook members or portions 55 will engage into the openings 53 whereby the two members 41 and 43 will be held in such position as to form a housing or sheath of substantially box shape in lateral section. The slots 49 are preferably made wider at that part away from the intermediate wall portion so that when the housing comprising the assembled members 41 and 43 is moved into operative position around the tank 21, this can be done easily and quickly without causing undue stress in the edge portions 51. It is further obvious that the slots 45 will be opened when the member 41 is moved into position around the tank 21.

The formed resistance conductor 39 may be easily and quickly moved into position in the initially straight housing assembly comprising the members 41 and 43, after which the housing, together with the resistance conductor or heating element 39, can be moved into the tunnel 35 substantially in the manner shown in Fig. 3 of the drawings where I have illustrated a partially inserted heating unit comprising the members 41 and 43 in closely assembled positions relatively to each other together with a resistance conductor 39 therein.

I prefer to make the thickness of the member 41 very small, say on the order of .015", and prefer also to make it of aluminum.

I provide lugs 57 of substantially L-shape for receiving the respective end portions of the resistance conductor 39, which end portions may extend through openings in the lugs 57 and be bent thereover so that the end portions of the conductor will be held in fixed positions therein.

Adjustable clamping bolts 59 may be used, extending through one lug 57 and having screw threaded engagement with the other lug. Turning the bolts 59 initially causes increasing tension on the conductor 39 and when the lugs 57 have been moved close enough together to engage the bent-out end portions 42 they will cause tension to be applied to the member 41 to cause the latter to be held in good heat-conducting engagement with the outside surface of a tank.

If desired or considered necessary because of the high break-down voltage to which a heating unit of this kind may be subjected, I may provide an anodic coating of the hereinbefore described kind on the entire surface of the member 41 so that there will be not less than three such coatings between the resistance conductor and the outer surface of the tank 21.

The hereinbefore described inherent resilience or springiness of the resistance conductor is made use of by me to hold the conductor in close heat-conducting engagement with the outer surface of the member 41 and particularly with the intermediate portion thereof. The two lugs 57 hereinbefore described may be so constructed as to provide means by which the resistance conductor 39 may be yieldingly and resiliently held in proper operative and heat-conducting engagement with the outer surface of member 41 and for this purpose I may provide an opening 61 in a part of each lug 57, which opening may have positioned therein a bushing 63 of electric-insulating material with the end portion of the formed conductor 39 extending therethrough and then bent over, as shown more particularly in Fig. 11 of the drawings. It is obvious that the straight end portion of the conductor 39 may be drawn through the bushing 63 and that if this is done before tightening the clamping bolts 59, the tightening of these bolts 59 will cause tension to be given to the formed resistance conductor 39. While a simple bushing is shown, it is obvious that its general shape may be such as to ensure that the end of the conductor 39 will not engage the lug 57, although the anodic coating on the conductor will usually properly insulate the end portion from the lug.

While I have shown the formed resistance conductor 39 to comprise a plurality of substantially parallel-extending convolutions or a plurality of reverse integral hairpin bends, which convolutions extend laterally of the length of the formed unit, I do not desire to be limited thereto since these convolutions need not extend substantially parallel with each other, the main consideration being that the conductor is of convoluted shape and has inherent springiness or resiliency, all as hereinbefore set forth.

It is obvious that while it may be possible to hold the formed resistance conductor 39 midway between the edge portions 47 of member 41, such will not continue after repeated heating and cooling of the resistance conductor but since the member 41 has preferably an anodic coating on its entire surface, the resistance conductor 39, which has also an anodic coating thereon, can rest upon the lower one of edge portions 47 as shown more particularly in Figs. 1 and 12 thereof.

It is obvious that the housing or sheath comprising elements 41 and 43 will receive and transmit substantially all of the heat generated in such resistance conductor by the passage of an electric current therethrough. Naturally the larger proportion of the heat so generated in conductor 39 will be transmitted by conduction to member 41 and from there to the outer surface of the tank 21. But any heat not so transmitted but radiated from the resistance conductor 39 will be received by either the inner edge portions 47 or by the intermediate portion of member 43 and will be transmitted by conductive action to the intermediate portion of member 41 and from there by conduction to the outer surface of tank 21.

It is obvious that it is not necessary to use a housing or sheath, such as described, particularly if the operating temperatures are relatively low and the loss of the relatively small amount of heat transmitted by radiation away from the tank is not objected to. In this case the convoluted resistance conductor 39, provided with an "anodic" coating, may be clamped directly into close heat-conducting engagement with the outer surface of the tank by clamping means as shown in Figs. 10 and 11, namely, the lugs 57 and the bolts 59.

It is also obvious that member 41 alone may be used instead of both 41 and 43, especially if the resistance conductor 39 is subject to high breakdown voltage stresses, the entire surface of member 41 being provided with an "anodic" coating.

It is further obvious that the heating element comprising particularly the formed resistance conductor 39 has been reduced to its simplest form and that it comprises an electric insulating coating integral with the resistance conductor and that it has inherent resilience or springiness which, cooperating with the conductor clamping means, assures a close and efficient heat-conducting engagement with the sheath or housing.

It may also be noted that it is considered within the scope of my invention to use the inner part 41, of channel-shape, with an uncoated resistance conductor 39, with at least the outer surface of member 41, that is that surface thereof engaged by the resistance conductor 39, having thereon a coating of the kind above described. If such a heating unit is to be subjected to a higher breakdown voltage, the entire surface of member 41 may have such a coating provided thereon, so that two such coatings will be interposed between the conductor and the tank.

It is further obvious that since the anodic coatings are high temperature-resisting there is little or no chance for deterioration of the electric-insulating coating and since one of the essential considerations of such coatings is that they be able to withstand bending or changing of shape of the surface on which they have been formed, no physical deterioration of such coatings can occur once they have been properly formed.

Various modifications may be made in the devices constituting my invention and all such modifications clearly coming within the scope of the appended claims are to be considered as being covered thereby.

I claim as my invention:

1. An electric heating unit adapted to be mounted on the outside of a hot water tank, comprising a resistance conductor having a plurality of spaced convolutions extending laterally of the length of the heating unit and having end connections for the adjacent convolutions, said convolutions and end connections being inherently resilient along the length of the heating unit and said resistance conductor having thereon an inorganic, integral, heat-conducting, high temperature-resisting and electric-insulating coating and mechanical means connected to the end portions of said resistance conductor to tightly hold the resistance conductor in heat-conducting operative engagement with the outside surface of the tank.

2. A clamp-on electric heating unit adapted to be mounted on a hot water tank, comprising an inherently resilient resistor member having a plurality of spaced laterally-extending connected convolutions and mechanical means connected to the end portions of said resistor member to hold said resistor member under longitudinal tension in heat-conductive operative engagement with the outside of a tank, the resistor member having its surface covered with an inorganic, integral, heat-conducting, high temperature-resisting and electric-insulating coating.

3. An electric heating unit adapted to be clamped around a hot water tank and comprising a resistor member having a plurality of spaced laterally-extending connected convolutions, being inherently resilient both laterally and longitudinally of the heating unit and having its surface covered with an inorganic, integral, heat-conducting, high temperature-resisting and electric-insulating coating, a member of substantially channel-shape in lateral section in contact with the outside of the tank and mechanical means engaging with the end portions of said resistor member adapted to hold the latter in good heat-conducting contact with the outside surface of said member of substantially channel-shape and also to hold said member of channel-shape in good heat conducting engagement with the outside surface of a tank.

4. An electric heating unit adapted to be mounted around a hot water tank and comprising a resistor element having a plurality of spaced convolutions extending angularly relatively to the length of the heating unit, being inherently resilient both laterally and longitudinally of the heating unit and having its surface covered with an inorganic, integral, heat-conducting, high temperature-resisting and electric-insulating coating, a sheath for said resistor element comprising a two-part box-like metal casing extending around the tank in engagement with the outer surface thereof, the resistor element being adapted to rest on a lower side portion of said box-like sheath and adjustable mechanical means adapted to hold the sheath in close heat-conducting engagement with the tank and to also hold the resistor element in close heat-conducting engagement with the sheath.

5. An electric heating unit as set forth in claim 3 in which at least the outer surface of the member of channel-shape has thereon an inorganic, integral, heat-conducting, high temperature-resisting and electric-insulating coating.

6. An electric heating unit as set forth in claim 4 in which at least that part of the surface of the sheath which is engaged by the resistance conductor has thereon an inorganic, integral, heat-conducting, high temperature-resisting and electric-insulating coating.

7. An electric heating unit adapted to be mounted around the outside of a hot water tank, comprising a convoluted metallic resistor member inherently resilient along the length of the heating unit, a metallic housing member adapted to be mounted around and in engagement with the outside of a tank, one of said members having on that surface thereof in engagement with the other member an inorganic, integral, heat-conducting, high temperature-resisting and electric-insulating coating and mechanical clamping means operatively connected to the end portions of said metallic housing member and of said resistor member to tightly clamp said housing around a tank and to hold the resistance member in good heat-conducting engagement with the housing member.

8. An electric heating unit adapted to be mounted around the outside of a hot water tank, comprising a convoluted metallic resistor member inherently resilient along the length of the heating unit, a metallic housing member adapted to be mounted around and in engagement with the outside of a tank, at least the outer surface of the metallic housing member having thereon an inorganic, integral, heat-conducting, high temperature-resisting and electric-insulating coating and mechanical clamping means operatively connected to the end portions of said metallic housing member and of said resistor member to tightly clamp said housing around a tank and to hold the resistance member in good heat-conducting engagement with the housing member.

CLARK M. OSTERHELD.